April 14, 1959  E. W. GORTER ET AL  2,882,234
METHOD OF PRODUCING MAGNET CORES HAVING AN APPROXIMATELY
RECTANGULAR SHAPE OF THE HYSTERESIS LOOP
Filed Dec. 20, 1954

INVENTORS
EVERT WILLEM GORTER
CORNELIS JACOBUS ESVELDT
BY
AGENT 2,882,234
Patented Apr. 14, 1959

2,882,234
METHOD OF PRODUCING MAGNET CORES HAVING AN APPROXIMATELY RECTANGULAR SHAPE OF THE HYSTERESIS LOOP

Evert Willem Gorter and Cornelis Jacobus Esveldt, Emmasingel, Eindhoven, Netherlands, assignors, by mesne assignments, to North American Philips Company, Inc., New York, N.Y., a corporation of Delaware Application December 20, 1954, Serial No. 476,528

Claims priority, application Netherlands December 21, 1953

3 Claims. (Cl. 252—62.5)

Magnet cores having an approximately rectangular shape of the hysteresis loop are of importance for various uses. This kind of cores is inter alia used for the so-called "magnetic memories" (cf. for example W. N. Papian: "Proceedings of the IRE," April 1952, pages 475 to 478; D. R. Brown and E. Albers-Schoenberg: "Electronics," April 1953, pages 146 to 149). Such magnetic memories are used inter alia in counting machines and automatic pilots. These cores are furthermore used in magnetic switches.

Figure 1:
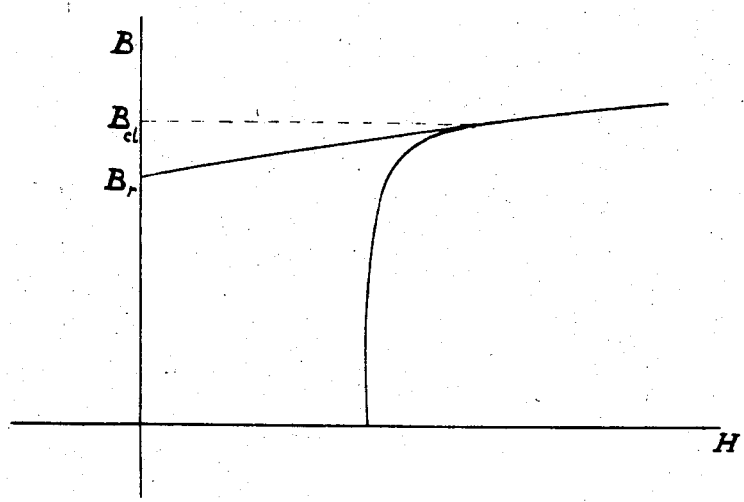
Figure 2:
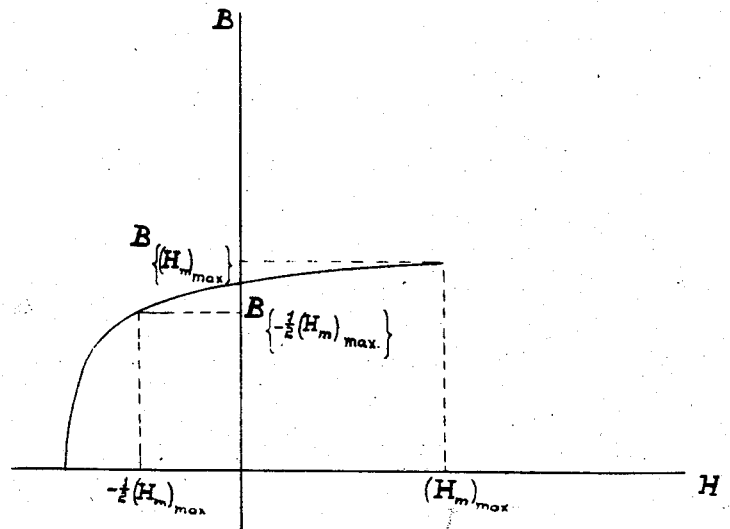

The invention will be described with reference to the accompanying drawing in which Figs. 1 and 2 show portions of a hysteresis loop of a magnetic material.

The extent to which the shape of the hysteresis loop approaches the form of a rectangle may be expressed quantitatively in various ways. A conventional measure is for instance the quotient $$\frac{B_r}{B_{cl}}$$

The meaning of this quotient is evident from Fig. 1, which shows diagrammatically part of a saturation magnetisation curve. In this figure $B_r$ designates the retentivity and $B_{cl}$ the inductance at which the hysteresis loop just closes. In practice it is often not simple to measure $B_{cl}$ with great accuracy. However, an approximately correct value of $B_{cl}$ is readily found by taking the average of the inductances subsequent to partial magnetisation or partial demagnetisation (with intermediate saturation). The two inductances being measured at the same field strength, which is chosen to be such that the said inductances differ from one another by more than 1%, but less than 3%. This applies to the measurements carried out in accordance with the present invention.

For these measurements use was made of a ballistic galvanometer (cf. Bozorth: "Ferromagnetics," page 843). Where reference is made herein to the quotient $$\frac{B_r}{B_{cl}}$$

it is assumed to be measured on an annular magnet core having a constant diameter of the ferromagnetic material throughout the periphery of the ring and having an outer diameter of not more than 1.6 times the inner diameter.

The extent to which the shape of the hysteresis loop approaches that of a rectangle may, as an alternative, be expressed by means of the so-called "squareness ratio" $(R_s)_{max}$. For the meaning of this magnitude we refer to the aforesaid literature. For the sake of completeness we add a brief explanation with reference to Fig. 2, which also shows diagrammatically part of a magnetisation curve relating to a case in which demagnetisation started before magnetic saturation had been attained. The magnitude $(R_s)_{max}$ is defined by $$\left\{\frac{B_{(-\frac{1}{2}H_m)}}{B_{(H_m)}}\right\}_{max}$$

The quotient $$\frac{B_{(-\frac{1}{2}H_m)}}{B_{(H_m)}}$$

is a function of the maximum field strength $H_m$ applied. It is found that this quotient has a maximum value for a particular value of $H_m$, which in general, differs little from the coercivity $H_c$. This maximum value of the quotient is designated by the symbol $(R_s)_{max}$. The measurements of $$B_{(H_m)} \text{ and } B_{(-\frac{1}{2}H_m)}$$

required to define $(R_s)_{max}$, may again be carried out by means of a ballistic galvanometer. In this case again the measuring objects were annular magnet cores having a constant diameter of the magnetic material through the periphery of the ring and having an outer diameter of at least 1.6 times the inner diameter. In the use of ferromagnetic materials having a shape of the hysteresis loop approaching that of a rectangle we are, in general, concerned with alternating currents of high frequency, so that it is required to minimize eddy currents. With the use of ferromagnetic alloys this may, to a certain extent, be realized by composing the magnet core of relatively insulated, very thin layers of the ferromagnetic material. However, it is often extremely difficult to construct cores having a shape of the hysteresis loop approaching that of a rectangle from these thin layers. Consequently, with these high frequencies it is advantageous and with still higher frequencies it is even necessary to use magnetically weak, ferric oxide containing materials with spinel structure, since these substances themselves have already a very poor electric conductivity.

For the serviceability of the magnet cores concerned for magnetic memories and magnetic switches it is an essential condition that the coercivity $(H_c)$ should be low (preferably not more than 10 oersted and preferably even lower than 5 oersted), since otherwise the electromagnetic losses would be too high.

According to the invention it has now been found that magnet cores having a shape of the hysteresis loop approaching that of a rectangle, wherein the conditions $$\frac{B_r}{B_{cl}} > 0.7$$

$(R_s)_{max} > 0.6$ and $H_c < 4$ Oersted are fulfilled, may be obtained by manufacturing them from a material consisting at least mainly of at least one compound of the formula $Li_xNi_{(1-2x)}Fe_{(2+x)}O_4$ wherein $x$ lies between 0.40 and 0.48, these compounds being produced by heating a mixture of lithium, nickel and iron compounds in the desired weight ratio in a gaseous atmosphere having an oxygen content of more than 50% by volume to a temperature of 1100 to 1200° C.

Example

A mixture of lithium-carbonate and iron oxides is ground in absolute alcohol or anhydrous benzene for 8 to 10 hours and then preheated to 750° C. in a gaseous mixture of 1 part by volume of carbon dioxide and 6 parts by volume of oxygen for one hour. Subsequent to cooling the reaction product is ground in absolute alcohol for some time, for example 2 hours. With a correct choice of the ratio between the quantities of lithium carbonate and iron oxide, this choice being assumed to be correct, the reaction product consists of a compound the composition of which corresponds substantially to the formula $LiFe_5O_8$.

A preheated mixture of nickel oxide and iron oxide is furthermore produced. To this end a mixture of nickel carbonate and iron oxide is ground in a ratio of 1 atom percent of nickel to about 2 atom percent of iron for 10 hours in alcohol, after which it is heated to 750° C. in an oxygen atmosphere for one hour. The reaction product is ground, subsequent to cooling, in alcohol for two hours.

Before the final reaction the compounds $LiFe_5O_8$ and the preheated mixture of nickel oxide and iron oxide are ground in the desired weight ratio in absolute alcohol for five hours, the mixture being heated to a temperature lying between 1100 and 1200° C. in oxygen. The following table indicates the composition, the value of the quotient $$\frac{B_r}{B_{cl}}$$

the value of $(R_s)_{max}$ and the value of $H_c$ of a few magnet cores made from preparations thus produced.

| Chemical constitution | $\frac{B_r}{B_{cl}}$ | $(R_s)_{max}$ | $H_c$ |
|---|---|---|---|
| $Li_{0.47}Ni_{0.06}Fe_{2.47}O_4$ | 0.90 | 0.75 | 3.5 |
| $Li_{0.46}Ni_{0.08}Fe_{2.46}O_4$ | 0.91 | 0.79 | 3.6 |
| $Li_{0.42}Ni_{0.16}Fe_{2.42}O_4$ | 0.90 | 0.72 | 3.6 |

The squareness ratio of the hysteresis loop of the magnet cores concerned may be improved by heating preferably to a temperature at least equal to the Curie temperature, after which they are cooled in a magnetic field. With the magnet cores of the composition corresponding to the formula $Li_{0.47}Ni_{0.06}Fe_{2.47}O_4$ it was found to be possible to improve in this manner the squareness ratio from 0.75 to 0.85.

What is claimed is:

1. A method of manufacturing a magnetic core comprising the steps of forming a mixture of $LiFe_5O_8$ and a prefired mixture of nickel oxide and iron oxide in which the atomic ratio Ni:Fe is 1:2 in proportions forming upon heating a lithium nickel ferrite having the formula $Li_xNi_{(1-2x)}Fe_{(2+x)}O_4$, $x$ being between 0.40 and 0.48, said ferrite having a substantially rectangular hysteresis loop in which the squareness ratio $B_r/B_{cl}$ is greater than 0.70, $(R_s)_{max}$ is greater than 0.6 and $H_c$ is less than 4 oersted, heating said mixture in an atmosphere containing more than 50% by volume of oxygen at a temperature of about 1100° C. to 1200° C. for a time sufficient to form said ferrite, and cooling said ferrite to thereby produce said core with said rectangular hysteresis loop.

2. The method of claim 1, in which the value of $(R_s)_{max}$ is increased by subsequently heating the core at least to the Curie temperature of said magnet core and then cooling said core in a magnetic field.

3. A magnetic core having a substantially rectangular hysteresis loop and consisting essentially of a lithium-nickel ferrite having the formula $Li_xNi_{(1-2x)}Fe_{(2+x)}O_4$, $x$ being between 0.40 and 0.48, said ferrite having a squareness ratio $B_c/B_{cl}$ which is greater than 0.70, an $(R_s)_{max}$ which is greater than 0.6 and a coercive force $(H_c)$ which is less than 4 oersted, said core being produced by sintering at a temperature of about 1100° C. to 1200° C. in an atmosphere containing at least 50% by volume of oxygen, a mixture of $LiFe_5O_8$ and a prefired mixture of nickel oxide and iron oxide in which the atomic ratio Ni:Fe is 1:2 in proportions and for a time sufficient to produce said ferrite.

References Cited in the file of this patent

"Proceedings of the IRE," vol. 44, No. 10, October 1956, pages 1235 and 1305.